United States Patent Office 2,810,626
Patented Oct. 22, 1957

2,810,626
PROCESS FOR PRODUCING URANIUM HEXAFLUORIDE

Robert Dudley Fowler, Baltimore, Md., assignor to the United States of America as represented by the United States Atomic Energy Commission No Drawing. Application February 13, 1943, Serial No. 475,851

2 Claims. (Cl. 23—14.5)

This invention relates to a process for the production of metal fluorides and more particularly to a process for the production of uranium hexafluoride from the oxides of the metal.

An object of the present invention is to provide a simple and economical method for the production of uranium tetrafluoride $UF_4$.

An additional object of the invention is the conversion of $UF_4$ to uranium hexafluoride $UF_6$ by the action of elemental fluorine or a fluorinating agent such as cobalt trifluoride $CoF_3$.

An additional object is the provision of a method for the production of $UF_6$ embodying the advantages of minimum handling operations, no filtrations and no dehydrations.

Other objects will in part be obvious to those skilled in the art and in part pointed out hereinafter.

One method for the production of uranium hexafluoride $UF_6$ is by the action of a fluorinating agent on uranium tetrafluoride $UF_4$. However, $UF_4$ is not a commercially available material and I have therefore aimed to provide a process which is applicable to the readily available sources of uranium such as uranium trioxide $UO_3$ and uranium tritoctoxide $U_3O_8$. In accordance with the invention these higher oxides of uranium may be reduced to uranous oxide (uranium dioxide) $UO_2$, the latter converted into $UF_4$ by reaction with hydrofluoric acid $HF$ and the $UF_4$ converted to $UF_6$ by reaction with a fluorinating agent.

Uranium dioxide, $UO_2$, may be converted directly into $UF_4$ by treatment with dry hydrofluoric acid $HF$ according to the reaction equation

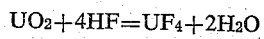

$$UO_2 + 4HF = UF_4 + 2H_2O$$

However, neither the treatment of $UO_2$ nor the treatment of the higher oxides of uranium, $UO_3$ and $U_3O_8$, with $HF$ will yield $UF_6$. Moreover, such treatment of $UO_3$ and $U_3O_8$ instead of producing $UF_4$ tends to produce the oxyfluorides.

A process in accordance with the invention is as follows:

The uranium oxide, either $UO_3$ or $U_3O_8$ or a mixture of the two, is placed in a reaction chamber, for example in a copper boat or tray enclosed in a copper oven, and heated to 500–650° C. and hydrogen gas is passed through the oven in contact with the uranium oxide in the boat. For a batch of say 3 kilograms it is desirable to pass the hydrogen at a relatively slow rate, say about 100 cc. per minute for a time sufficient to complete the conversion, say 8 or 9 hours. The oven is then swept clean of hydrogen and water formed by the reaction by, e. g., a current of dry nitrogen gas and while continuing to maintain the temperature between 400° C. and 600° C. anhydrous hydrofluoric acid is passed through at the rate of about 100 cc. per minute for 8 to 9 hours. It will be appreciated that the rate of supplying hydrogen and hydrofluoric acid will depend upon the amount of surface presented for reaction. It is desirable to spread the uranium oxide fairly thin say about one-half inch deep in the copper boat so as to facilitate its reduction by the hydrogen, and the lower oxide remains in the same position for reaction with the hydrofluoric acid.

After completion of the conversion to uranium tetrafluoride $UF_4$ the reaction chamber is swept clear of $HF$ and $H_2O$ formed by the reaction by means of a stream of nitrogen or other suitable inert gas, the temperature of the reaction chamber is lowered to about 400° C. or less and the $UF_4$ is mixed with the requisite quantity of cobalt trifluoride $CoF_3$ (2 gram mols of $CoF_3$ to one gram mol of $UF_4$). After clearing the reaction vessel of air, preferably by evacuating it, the mixture is heated to 300–400° C. and the resulting $UF_6$ led off to a condenser at −70° C.

The $CoF_3$ for this process may be made by treating cobaltous fluoride $CoF_2$ with elemental fluorine e. g. by placing the $CoF_2$ in a copper boat in a copper reaction chamber, heating to about 200° C. and passing fluorine gas into the chamber. An advantage of this process is that the fluorine gas, produced for instance by the electrolysis of an acid fluoride or mixture or combination of alkali metal fluoride and hydrofluoric acid, need not be purified with respect to $HF$ before it is used. Another advantage of the above procedure is that after heating the mixture of $UF_4$ and $CoF_3$ and expelling the $UF_6$, the residue of $CoF_2$ may be treated with fluorine, as described above, to reconvert it into $CoF_3$ and the latter used again in a repetition of the process.

Other metal fluorides, such as silver difluoride $AgF_2$ and manganese trifluoride $MnF_3$, may be substituted for the $CoF_3$ in the above process, but practically, so far as I have tested them, $CoF_3$ is most satisfactory. $MnF_3$, for instance, gives a fusible mixture with the $UF_4$ which is difficult to handle, does not give complete conversion and is difficult to reform for admixture with more $UF_4$ for a repetition of the process. The use of such metal fluorides as cobaltic fluoride, silver difluoride and manganese trifluoride to convert uranium tetrafluoride to uranium hexafluoride is more fully described and claimed in my copending application, Serial No. 730,557, filed February 24, 1947, as a continuation-in-part of the present application.

The utilization of the hydrogen in the reduction of the higher oxide to uranium dioxide $UO_2$, the utilization of the $HF$ in the conversion of $UO_2$ to uranium tetrafluoride $UF_4$ and the utilization of the elemental fluorine in the conversion of $UF_4$ to uranium hexafluoride $UF_6$ also are highly efficient. It will be noted that the handling of the materials and the apparatus are very simple and inexpensive and the process is therefore highly economical and relatively free of danger, considering the nature of the reagents and conditions involved.

As a modification of the above described process I may employ elemental fluorine as the fluorinating agent for the conversion of $UF_4$ into $UF_6$. In this case, elemental fluorine gas (free of $HF$, $O_2$ and $H_2O$) is passed into the chamber at a suitable rate, say at the rate of 100 cc. per minute and the $UF_6$ formed passes out and is delivered to a condenser or trap cooled to a sufficiently low temperature to condense it, e. g. −70° C., produced by a mixture of solid carbon dioxide and methyl alcohol. The overall yield of $UF_6$ by this method, based upon the uranium content of the uranium oxide used usually is better than 95%.

It may here be pointed out that under certain conditions, depending upon the arrangement of the apparatus employed and the quantity and rate of introduction of the fluorine employed, the formation of uranium pentafluoride $UF_5$ may result as an incidental step in the process; however, under such conditions, continued introduction of fluorine will reconvert the UF₅ to UF₆ and the process will proceed as above described.

The higher uranium oxides may be reduced also by means of carbon and I have worked out a process of which the following is an illustrative example involving the use of carbon instead of hydrogen as the reducing agent.

Finely divided carbon such as sugar carbon or charcoal or activated carbon is mixed with finely divided uranium tritaoctoxide U₃O₈ using a proportion of the carbon to the oxide about 50% in excess of that theoretically required (according to the reaction

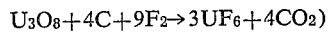

$$U_3O_8 + 4C + 9F_2 \rightarrow 3UF_6 + 4CO_2)$$

to combine with all of the oxygen as CO₂. The mixture is placed in a copper boat or tray in a copper or nickel oven and heated to from 400° C. to 500° C. e. g. by wrapping the oven with electrical resistance heating elements. Fluorine gas free of HF and H₂O is then passed into the oven and the gas leaving the oven is run through a trap or condenser cooled to −70° C. to collect the UF₆ formed. The yield of UF₆ based upon the uranium content of the oxide used is from 95 to 100% and the utilization of the fluorine gas supplied to the reaction chamber is highly efficient if the rate of flow of the gas compared to the exposed surface of the mixture of the uranium oxide and carbon is not excessive. In this instance also the rate of supply of fluorine gas may be at the rate of about 100 cc. per minute for a charge of about 3 kilograms of the oxide spread in a layer about one-half inch deep.

In the above described process any of the oxides of uranium, i. e., U₃O₈ or UO₃ or mixtures thereof, may be employed. This process has the advantage that the oxide is deoxygenated and converted into the hexafluoride in a single operation and the possible disadvantage that the fluorine is supplied entirely in the form of fluorine gas whereas in the hydrogen reduction process a part of the fluorine is supplied as hydrofluoric acid.

In this process as in the hydrogen reduction process cobalt trifluoride CoF₃ may be substituted for the fluorine as the fluorinating agent by simply mixing the uranium oxide, the carbon and the CoF₃ together and heating the mixture. The use of carbon along with a fluorinating agent such as elemental fluorine or cobaltic fluoride to convert oxides of uranium to uranium hexafluoride is more fully described and claimed in my copending application, Serial No. 730,556, filed February 24, 1947, as a continuation-in-part of the present application.

As many embodiments may be made of this inventive concept and as many modifications may be made in the embodiments hereinbefore set forth, it is to be understood that all matter described herein is to be interpreted merely as illustrative and limited only by the scope of the appended claims.

I claim:

1. A process for producing uranium hexafluoride from a higher oxide of uranium selected from the group consisting of uranium trioxide and uranium tritaoctoxide which is performed in a single reaction zone without removal of the intermediate uranium reaction products therefrom which comprises passing gaseous hydrogen over a thin layer of said higher oxide of uranium at a temperature of 500° to 650° C. to convert said higher oxide to uranium dioxide, passing anhydrous hydrogen fluoride over the thin layer of uranium dioxide at a temperature of 400° to 600° C. to convert said uranium dioxide to anhydrous uranium tetrafluoride, then passing elemental fluorine over the layer of anhydrous uranium tetrafluoride thus obtained to convert it to uranium hexafluoride, and collecting the uranium hexafluoride which distills from the reaction zone in a trap cooled to a sufficiently low temperature to condense the distilled uranium hexafluoride.

2. A process for producing uranium hexafluoride from a higher oxide of uranium selected from the group consisting of uranium trioxide and uranium tritaoctoxide which is performed in a single reaction zone without removal of the intermediate uranium reaction products therefrom which comprises passing gaseous hydrogen over a thin layer of said higher oxide of uranium at a temperature of 500° to 650° C. to convert said higher oxide to uranium dioxide, passing a current of dry nitrogen gas through the reaction zone to sweep out hydrogen and water remaining therein after completion of the preceding step, passing anhydrous hydrogen fluoride over the thin layer of uranium dioxide remaining in the reaction zone at a temperature of 400° to 600° C. to convert said uranium dioxide to anhydrous uranium tetrafluoride, passing a stream of dry nitrogen through the reaction zone to sweep it clear of hydrogen fluoride and water left from the preceding reaction, then passing elemental fluorine over the layer of anhydrous uranium tetrafluoride thus obtained to convert it to uranium hexafluoride, and collecting the uranium hexafluoride which distills from the reaction zone in a trap cooled to a sufficiently low temperature to condense the distilled uranium hexafluoride.

References Cited in the file of this patent

"Comprehensive Treatise on Inorganic and Theoretical Chemistry," vol. XII (1932), pages 39, 40, 75.

"Comprehensive Treatise on Inorganic and Theoretical Chemistry," vol. XII (1932), page 74.

"Comprehensive Treatise on Inorganic and Theoretical Chemistry," vol. XIV (1935), pages 603, 608.